US008207270B2

(12) United States Patent
Kerstetter, III et al.

(10) Patent No.: US 8,207,270 B2
(45) Date of Patent: Jun. 26, 2012

(54) THERMOPLASTIC ELASTOMER COMPOSITIONS, METHODS OF MAKING AND ARTICLES MADE FROM THE SAME

(75) Inventors: Randal Howard Kerstetter, III, Wadsworth, OH (US); Gary Keith Lawrence, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 483 days.

(21) Appl. No.: 11/529,853

(22) Filed: Sep. 29, 2006

(65) Prior Publication Data

US 2008/0081869 A1  Apr. 3, 2008

(51) Int. Cl.
*C08L 23/00* (2006.01)
*C08L 23/04* (2006.01)
*C08F 8/00* (2006.01)
*C08K 3/00* (2006.01)
*C08K 5/00* (2006.01)

(52) U.S. Cl. ........ 525/240; 525/191; 525/232; 524/424; 524/445; 524/285; 524/502

(58) Field of Classification Search .............. 525/191, 525/240, 232; 524/502, 424, 445, 285
See application file for complete search history.

(56) References Cited

U.S. PATENT DOCUMENTS

| | | | |
|---|---|---|---|
| 3,037,954 A | 6/1962 | Gessler et al. | |
| 4,130,534 A | 12/1978 | Coran et al. | |
| 4,130,535 A | 12/1978 | Coran et al. | |
| 4,311,628 A | 1/1982 | Abdou-Sabet et al. | |
| 4,594,390 A | 6/1986 | Abdou-Sabet et al. | |
| 5,177,147 A | 1/1993 | Spenadel et al. | |
| 5,290,886 A | 3/1994 | Ellul | |
| 5,627,226 A * | 5/1997 | Lustiger et al. ............ | 524/90 |
| 6,147,160 A | 11/2000 | Wang et al. | |
| 6,437,048 B1 | 8/2002 | Saito et al. | |
| 6,465,551 B1 * | 10/2002 | Zhao et al. .................. | 524/284 |
| 6,582,503 B2 * | 6/2003 | Dotson et al. .............. | 106/162.1 |
| 6,583,206 B2 | 6/2003 | Zhao | |
| 6,750,284 B1 | 6/2004 | Dharmarajan et al. | |
| 6,828,019 B2 | 12/2004 | Kong et al. | |
| 6,946,507 B2 * | 9/2005 | Mannion et al. ............ | 524/285 |
| 6,984,688 B2 | 1/2006 | Gu | |
| 2001/0003768 A1 * | 6/2001 | Finerman et al. ........... | 525/192 |
| 2004/0229983 A1 | 11/2004 | Winowiecki | |
| 2006/0014903 A1 * | 1/2006 | Vromman .................... | 525/192 |
| 2006/0020067 A1 | 1/2006 | Brant et al. | |
| 2006/0063887 A1 * | 3/2006 | Kang et al. .................. | 525/71 |
| 2006/0079613 A1 | 4/2006 | Hanssen | |
| 2006/0199910 A1 * | 9/2006 | Walton et al. ............... | 525/192 |
| 2007/0093605 A1 * | 4/2007 | Adur ............................ | 525/242 |
| 2008/0058471 A1 * | 3/2008 | Nishihara et al. ........... | 525/88 |

FOREIGN PATENT DOCUMENTS

| | | |
|---|---|---|
| EP | 0 703 279 | 3/1996 |
| EP | 1 270 696 | 1/2003 |
| EP | 0 930 336 | 10/2003 |
| EP | 1 619 218 | 1/2006 |
| EP | 1 634 919 | 3/2006 |
| JP | 05170939 * | 7/1993 |
| JP | 09 07169 | 3/1997 |
| JP | 10273569 A | 10/1998 |
| JP | 2002030152 A | 1/2002 |
| JP | 2005023148 A | 1/2005 |
| WO | 92/01747 | 2/1992 |
| WO | 92/02582 | 2/1992 |
| WO | 93/21262 | 10/1993 |
| WO | 99/48775 | 9/1999 |
| WO | 01/58988 | 8/2001 |
| WO | 2004/076540 | 9/2004 |
| WO | 2005/012410 | 2/2005 |
| WO | 2006/022973 | 3/2006 |
| WO | 2006/069233 | 6/2006 |
| WO | 2006/071721 | 7/2006 |
| WO | 2006/118807 | 11/2006 |

OTHER PUBLICATIONS

Hyperform HPN-68L flyer, Milliken, 2008.*
Polyolefin elastomer sheet, for external surface for car parts, furniture etc.—includes thermoplastic polyolefin elastomeric compsn. Contg. Nucleating agent to increase crystallization Derwent, Jul. 9, 1993, XP002301703 (abstract).
S. Abdou-Sabet et al.; "Dynamically Vulcanized Thermoplastic Elastomers," *Rubber Chemistry and Technology*, vol. 69, pp. 476-494 (1996).
T. Abraham et al., Chap. 5, "Thermoplastic Elastomers: Fundamentals and Applications," Rubber Compounding: Chemistry and Applications, B. Rodgers ed., Marcel Dekker, New York, 2004, pp. 163-212. (ISBN 0-8247-4871-9).
M. Arroyo et al., "Composites based on PP/EPDM blends and aramid short fibres. Morphology/behaviour relationship," Polymer 41, 2000, pp. 6351-6359.
Dr. M. Gerspacher et al., "Carbon Black-Elastomer Composites," Sid Richardson Carbon Company, Fort Worth, Texas, 2002, pp. 1-13.
Y. Li et al., "Crystallization Behavior of Carbon Black-Filled Polypropylene and Polypropylene/Epoxy Composites," Journal of Applied Polymer Science, vol. 102, Jul. 28, 2006, pp. 104-118.
M. Mucha et al., "Crystallization of isotactic polypropylene containing carbon black as a filler," Polymer 41, 2000, pp. 4137-4142.
J. T. Byers, Chap. 3, "Part I, Carbon Black," Rubber Technology Third Edition, Maurice Morton Ed., Chapman & Hall, London, 1995, pp. 59-60. (ISBN 0-412-53950-0).
M. P. Wagner, Chap 3, "Part II, Nonblack Fillers," Rubber Technology Third Edition, Maurice Morton Ed., Chapman & Hall, London, 1995, pp. 86-88. (ISBN 0-412-53950-0).

* cited by examiner

*Primary Examiner* — Vasu Jagannathan
*Assistant Examiner* — Irina Krylova
(74) *Attorney, Agent, or Firm* — Hsin Lin; Stephen Timmins; Shawn H. Foster

(57) ABSTRACT

Provided are thermoplastic elastomer compositions, many dynamically vulcanized, with superior crystallization kinetics, methods for making the compositions and articles made therefrom. The thermoplastic elastomer compositions comprise at least a propylene polymer thermoplastic, a rubber and a crystallization additive. The processes for preparation of the thermoplastic elastomer compositions comprises dynamic vulcanization of mixture of a propylene polymer thermoplastic, a rubber and a cure agent followed by addition of a crystallization additive. Further, preparation of articles from the thermoplastic elastomer compositions may be accomplished through traditional thermoforming operations useful with conventional thermoplastics.

23 Claims, No Drawings

THERMOPLASTIC ELASTOMER COMPOSITIONS, METHODS OF MAKING AND ARTICLES MADE FROM THE SAME

FIELD OF THE INVENTION

The present invention relates to thermoplastic elastomer compositions containing a crystallization additive, a process for producing thermoplastic elastomer compositions with superior crystallization characteristics and articles made therefrom.

BACKGROUND OF THE INVENTION

Thermoplastic polymer blends have found wide use in various fields such as car parts, appliance parts, hand-held utensils and other goods where a combination of durability and processability are valued. As used herein, "blend" shall mean a combination of two or more discrete components that may or may not be readily separable after combination, and the term "thermoplastic polymer blends" includes, without limitation, thermoplastic polyolefins, thermoplastic elastomers and thermoplastic vulcanizates. Thermoplastic polymer blends often are composed of a discrete phase of non-thermoplastic polymer dispersed in a matrix of thermoplastic polymer. The non-thermoplastic polymer phase is added to provide physical characteristics not present in the thermoplastic polymer absent the additional phase. Additionally, if the non-thermoplastic polymer phase is composed of material with limited processability, dispersing the non-thermoplastic polymer phase in a matrix of thermoplastic polymer imparts at least some of the processability characteristics of thermoplastic polymers to the blends.

Thermoplastic elastomers ("TPEs") are a special class of thermoplastic polymer blends and have a combination of both thermoplastic and elastic properties. Defined generally, a thermoplastic elastomer is a polymer or blend of polymers that can be processed and recycled in the same way as a conventional thermoplastic, yet has at least some of the properties and performance of a vulcanized rubber at service temperature. Blends or alloys of plastic and elastomeric rubber have become increasingly important in the production of higher performance thermoplastic elastomers, particularly for the replacement of thermoset rubber in various applications.

TPEs which have a combination of both thermoplastic and elastic properties are generally obtained by combining a thermoplastic polymer with an elastomeric composition in a way such that the rubber is intimately and uniformly dispersed as a discrete particulate phase within a continuous phase of the thermoplastic. Early work with vulcanized composition is found in U.S. Pat. No. 3,037,954, which discloses static vulcanization as well as the technique of dynamic vulcanization (explained further below). The resulting composition is a microgel dispersion of cured elastomer, such as EPDM rubber, butyl rubber, chlorinated butyl rubber, polybutadiene or polyisoprene in an uncured matrix of thermoplastic polymer such as polypropylene.

Depending on the ultimate application, such TPE compositions may comprise one or a mixture of thermoplastic materials such as propylene homo- or co-polymers, and like thermoplastics used in combination with one or a mixture of cured or non-cured elastomers such as ethylene propylene rubber ("EPM"), ethylene propylene diene rubber ("EPDM"), diolefin rubber, butyl rubber or similar elastomers. TPE compositions may also be prepared where the thermoplastic material used also includes an engineering resin having good high temperature properties, such as a polyamide or polyester using in combination with a cured or non-cured elastomer. Examples of such TPE compositions and methods of processing such compositions, including methods of dynamic vulcanization, may be found in U.S. Pat. Nos. 4,130,534, 4,130,535, 4,594,390, 5,177,147, and 5,290, 886 and W/O 92/02582, which are incorporated by reference as if fully included herein.

Olefinic thermoplastic elastomers (thermoplastic polyolefins, or "TPOs") are produced from an olefinic thermoplastic and a natural or synthetic rubber. Dynamically vulcanized thermoplastic elastomers (thermoplastic vulcanizates, or "TPVs"), a special subset of TPEs, also have a combination of thermoplastic and elastic properties. TPVs are prepared by melt mixing and shearing at least one each of a thermoplastic polymer, a vulcanizable elastomer and a curing agent. The vulcanizable elastomer is dynamically cured during the shearing and mixing and is intimately and uniformly dispersed as a particulate phase within a continuous phase of the thermoplastic polymer. See, for example U.S. Pat. Nos. 4,311,628 and 6,147,160, which are incorporated by reference as if fully included herein.

TPE compositions are normally melt processed using conventional thermoplastic molding equipment such as by injection molding, compression molding, extrusion, blow molding or other thermoforming techniques. In such TPE compositions, the presence of the rubber component does not necessarily improve the processability of the composition. In fact, where the rubber component in partially or fully cured (or cross-linked) in situ during the mixing of the TPE components (known as "dynamic vulcanization"), or where a dynamically vulcanized TPE composition is further processed, there are heavier demands placed upon processing machinery as compared with the processing of a thermoplastic composition which is free of cured elastomer.

Often TPEs, including polypropylene-based TPEs, suffer from long cycle times in thermoforming applications. "Cycle time" for thermoforming applications may generally be described as the duration from the introduction of molten polymer into a mold to the release of the molded part from the mold. A long cycle time may be the result of many factors, including low crystallization temperatures and low crystallization rates in the thermoplastic phase. Long cycle times lead to inefficiencies in the thermoforming process, increasing costs and decreasing productivity. It is known to alter the crystallization kinetics of thermoplastics, particularly propylene-based thermoplastics using additives such as nucleating agents. While not wishing to be bound by theory, it is believed that nucleating agents form nucleation centers, or active centers, on which formation of a polymer crystal may start. For slow crystallizing polymers like polypropylene, nucleating agents often will result in a clearer, more rapidly crystallizing polymer than will exist absent the agent. In thermoforming processes, the higher crystallization temperature or rate induced by the nucleating agent will reduce cycle times (as a major component of cycle time is the time required to cool the formed polymeric article to a point where it can be ejected from the die without losing its shape). Additionally, a TPE based on a nucleated thermoplastic may exhibit a variety of other improved properties, such as stiffness.

However, the use of nucleating agents with TPVs has been problematic at best. Nucleation agents are known to (1) provide little or no effect on the TPV when used in conventional quantities, (2) interfere with the rubber component curing process and (3) cause unwanted weight gain in the TPV. Why nucleation agents cause these problems has, heretofore, been unknown, thus the use of nucleation agents with TPVs has not generally been successful in altering the characteristics of TPVs to increase crystallization kinetics and reduce thermoforming cycle time.

It would be desirable to have a TPE (or TPV) with superior characteristics to reduce or eliminate known deficiencies of traditional TPEs used in thermoforming processes. It would likewise be desirable to have a process to produce a TPV with superior characteristics that may be more efficiently used in thermoforming processes.

SUMMARY OF THE INVENTION

One aspect of the present invention provides a TPE comprising a thermoplastic, a rubber, a cure agent and a crystallization agent exhibiting superior crystallization kinetics, especially crystallization temperature. In an aspect, the crystallization agent of the present invention is a nucleating agent, such as Hyperform® HPN-68L available from Milliken Chemical Company.

The invention also provides a process for producing a TPV with superior crystallization kinetics by timely addition of a crystallization agent in a manner that serves to reduce or eliminate the interference of the crystallization agent with the traditional dynamic vulcanization process used to make the TPV.

Finally, useful articles formed from the TPEs of the present invention are provided.

DETAILED DESCRIPTION

As used herein, "crystalline" is defined as having identifiable peak melting points above about 100° C. as determined by Differential Scanning Calorimetry (DSC peak melting temperatures).

For purposes of the invention, the melting point ("$T_m$") is determined by differential scanning calorimetry ("DSC"). For example, the method proceeds as follows. From 6 to 10 mg of a sheet of the polypropylene polymer is pressed at approximately 200° C. to 230° C. and is removed with a punch die. The sample is then annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 185° C., and occurs between the temperatures of 0° C. and 200° C. The thermal output in joules is a measure of the heat of fusion. The melting point is recorded as the temperature of the greatest heat absorption within the range of melting of the sample. This is called the first melt. The sample is then cooled at a rate of 10° C./min to 25° C. The non-isothermal crystallization temperature ("$T_c$") is recorded as the temperature of greatest heat generation, typically between 100° C. and 125° C. The area under the peak corresponds to the heat of crystallization. The sample is remelted by heating a second time, called the second melt, and is more reproducible than the first melt. The peak melting temperature from the second melt is recorded as the "2d Tm."

As used herein, the term "melting point" means average melting point when referring to a polymer blend. It is calculated by averaging the melting points of the thermoplastic polymers in the blend taking into account the proportion of each polymer in the blend.

As used herein, "molecular weight" means weight average molecular weight ("Mw"). Mw is determined using Gel Permeation Chromatography ("GPC"). Number average molecular weight ("Mn") is also determined using GPC. Molecular Weight Distribution (MWD) means Mw divided by number Mn. (For more information, see U.S. Pat. No. 4,540,753 to Cozewith et al. and references cited therein, and in Verstrate et al., 21 *Macromolecules* 3360 (1998)). The "Mz" value is the high average (or Z-average) molecular weight value, calculated as discussed by A. R. Cooper in CONCISE ENCYCLOPEDIA OF POLYMER SCIENCE AND ENGINEERING 638-39 (J. I. Kroschwitz, ed. John Wiley & Sons 1990).

As used herein, unless differentiated, "polymerization" includes homopolymerization, copolymerization, terpolymerization, and interpolymerization.

As used herein, the term "polypropylene polymer(s)" or "propylene polymer(s)" refers to homopolymers, copolymers, terpolymers, and interpolymers made from propylene derived units and containing at least 50 percent by weight of propylene derived units.

As used herein, the term "polymer" refers to the product of a polymerization reaction, and is inclusive of homopolymers, copolymers, terpolymers, etc.

As used herein, the term "homopolymer" is used with reference to a polymer resulting from the polymerization of a single monomer, i.e., a polymer consisting essentially of a single type of repeating unit.

As used herein, unless specified otherwise, the term "copolymer(s)" refers to polymers formed by the polymerization of at least two different monomers. For example, the term "copolymer" includes the copolymerisation reaction product of ethylene and an alpha-olefin, such as 1-hexene. However, the term "copolymer" is also inclusive of, for example, the copolymerisation of a mixture of ethylene, propylene, 1-hexene, and 1-octene.

As used herein, tacticity is measured by $^{13}C$ NMR. In particular, triad tacticity (of three propylene units) is determined by the methods described in U.S. Patent Application Publication 2004/0236042.

One or more embodiments of the present invention are directed toward thermoplastic elastomers with superior crystallization kinetics, especially crystallization temperature ("$T_c$"). The embodiments may include a propylene polymer thermoplastic, a rubber and a crystallization agent. In other aspects, the present invention is directed toward thermoplastic vulcanizates with superior crystallization kinetics, again especially $T_c$. Preferably, the thermoplastic vulcanizates are dynamically vulcanized thermoplastic vulcanizates. Preferably the $T_c$ of the thermoplastic elastomers and vulcanizates of the present invention is at least 6° C. greater than that of the TPE/TPV absent the crystallization agent. More preferably, the $T_c$ is at least 8° C. greater than that of the TPE/TPV absent the crystallization agent, more preferably at least 10° C. greater, even more preferably at least 12° C. greater and even more preferably at least 14° C. greater than that of the TPE/TPV absent the crystallization agent.

Another aspect of the present invention is a process for increasing the $T_c$ of a TPV. The process may include the steps of (1) preparing a TPV or TPV premix, (2) introducing an effective amount of a crystallization agent to the TPV (or premix) and (3) melt mixing the crystallization agent and TPV (or premix) to achieve a distribution of the agent within the TPV (or premix). As used herein, a "thermoplastic vulcanizate premix" or "TPV premix" is simply a mixture of components (more extensively described below) used to make a TPV, of which, the rubber phase has not yet been cured. Preparation of the TPV may be accomplished through any of the combination of components described in more detail below.

The processes of the present invention envision introduction of the crystallization agent to the TPV before, during or after curing of the TPV's rubber phase. As such, the processes of the invention envision accomplishing the process steps in one or multiple passes through processing devices suitable to produce TPVs (wherein successive passes may be through the same, or different, processing devices). Such processing devices are well known to those of skill in the art, and include, but are not limited to, a Banbury mixer, Buss co-kneader, Farrel continuous mixer, planetary extruder, single screw extruder, co-rotating multi-screw screw extruder, counter-rotating multi-screw screw extruder, co-rotating intermeshing extruder or ring extruder. Accordingly, the present invention envisions preparing a TPV in one or more passes through the processing device and adding the crystallization agent to the TPV in one or more successive passes through a processing device. Preferably, though, the crystallization agent is added to the TPV during a single pass through a processing device at a point after which the TPV is substantially cured. The crystallization agent is preferably added to the TPV after substantial curing of the TPV's rubber phase is complete.

The processes of the present invention further envision preparation of shaped articles (described below) from TPVs through conventional thermoplastic processing methods (also described below).

A wide range of TPE and TPV compositions can be used in methods of the present invention. Generally, the TPEs will include (i) a crosslinked or cured phase and (ii) an uncrosslinked or uncured phase. Similarly, the TPVs will include (i) a crosslinked or cured phase and (ii) an uncrosslinked or uncured phase. In both TPEs and TPVs according to the present invention, the uncured phase includes a propylene polymer thermoplastic (referred to as the "thermoplastic phase" or "thermoplastic component") and the cured phase a thermoset rubber (referred to as the "rubber phase" or "rubber component"). In TPVs, the cured phase includes a dynamically cured rubber. Further, the thermoplastic phase may include a functionalized thermoplastic polymer. In addition, the uncured phase may include other thermoplastic polymers and/or tackifier resins such as a functionalized tackifier resin.

Crystallization Agents

One or more embodiments of the present invention may include a crystallization agent. As used herein, a crystallization agent is a substance that, when added to a thermoplastic serves to enhance an aspect of the thermoplastic's crystallization kinetics, preferably crystallization temperature or crystallization half-time. In an embodiment, the crystallization agent is a nucleating agent. The nucleating agent may be a carboxylate salt, phosphate ester salt, sorbitol acetal compound or a dibenzylidene sorbitol compound, most preferably a dibenzylidene sorbitol compound. Other materials suitable for use as nucleating agents are known to those of skill in the art, many of which may be useful with the present invention. Many such nucleating agents are commercially available, including the Hyperform® line of products from Milliken Chemical, such as Hyperform® HPN-68L, which includes a salt of a saturated [2.2.1]dicarboxylate; specifically disodium salt of (1R,2R,3S,4S)-rel-bicyclo[2.2.1]heptane-2,3-dicarboxylic acid.

The crystallization agent(s) may be present in the TPEs and TPVs of the invention in an amount of from 0.05 wt % to 1.0 wt % relative to the total weight of all components of the thermoplastic phase of the TPV. More preferably the crystallization agent is present in an amount of from 0.1 wt % to 0.5 wt %, even more preferably of from 0.15 wt % to 0.35 wt % and even more preferably of from 0.2 wt % to 0.3 wt %, all relative to the total weight of all components of the TPV. In certain embodiments, the preferred amount of crystallization agent is independent of the quantity of propylene thermoplastic polymer present in the composition.

Rubber Phase

Rubbers include polymers that are capable of being dynamically crosslinked. Reference to a rubber may include mixtures of more than one rubber. Non-limiting examples of useful rubbers include olefinic elastomeric copolymers, butyl rubber, halogenated butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. In one or more embodiments, olefinic elastomeric copolymers include ethylene-propylene rubbers (such as EPM rubber and EPDM rubber), propylene-based rubbery copolymers, and/or ethylene-based plastomers.

Ethylene-Propylene Rubber

In one or more embodiments, ethylene-propylene rubbers include copolymers polymerized from ethylene, at least one $\alpha$-olefin monomer, and optionally at least one diene monomer. The $\alpha$-olefins may include, but are not limited to, propylene, 1-butene, 1-hexene, 4-methyl-1-pentene, 1-octene, 1-decene, or combinations thereof. In one embodiment, the $\alpha$-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, $\alpha$-olefin, and diene monomers, the copolymer may be referred to as a terpolymer or even a tetrapolymer in the event that multiple $\alpha$-olefins or dienes are used.

In one or more embodiments, the ethylene-propylene rubbers include from about 12 to about 85% by weight ("wt %"), or from about 20 wt % to about 80 wt %, or from about 40 wt % to about 70 wt %, and or from about 60 wt % to about 66 wt % ethylene units deriving from ethylene monomer, and from about 0.1 wt % to about 15 wt %, or from about 0.5 wt % to about 12 wt %, or from about 1 wt % to about 10 wt %, or from about 2 wt % to about 8 wt % diene units deriving from diene monomer, with the balance including $\alpha$-olefin units (such as propylene) deriving from $\alpha$-olefin monomer. Expressed in mole percent, the terpolymer of one embodiment includes from about 0.1 to about 5 mole percent ("mol %"), or from about 0.5 mol % to about 4 mol %, or from about 1 mol % to about 2.5 mol % diene units deriving from diene monomer. In one or more embodiments, where the diene includes 5-ethylidene-2-norbornene, the copolymer may include at least 3 wt %, in other embodiments at least 5 wt %, and in other embodiments at least 8 wt % units deriving from 5-ethylidene-2-norbornene.

In one or more embodiments, the ethylene-propylene rubbers have a weight average molecular weight (Mw) that is greater than 50,000, in other embodiments greater than 100,000, in other embodiments greater than 200,000, and in other embodiments greater than 300,000; and the weight average molecular weight of the ethylene-propylene rubbers of one embodiment is less than 1,200,000, in other embodiments less than 1,000,000, in other embodiments less than 900,000, and in other embodiments less than 800,000. In one or more embodiments, useful ethylene-propylene rubber has a number average molecular weight (Mn) that is greater than 20,000, in other embodiments greater than 60,000, in other embodiments greater than 100,000, and in other embodiments greater than 150,000; and the number average molecular weight of the ethylene-propylene rubber of one or more embodiments is less than 500,000, in other embodiments less than 400,000, in other embodiments less than 300,000, and in other embodiments less than 250,000.

In one or more embodiments, ethylene-propylene rubber may also be characterized by having a Mooney viscosity (ML(1+4) at 125° C.) per ASTM D 1646, of from about 25 to about 500 or from about 50 to about 450. Where higher molecular weight rubbers are employed within the thermoplastic vulcanizates of this invention, these high molecular weight polymers may be obtained in an oil-extended form. These oil-extended copolymers typically include from about 15 to about 100 parts by weight, per 100 parts by weight rubber ("phr"), of a paraffinic oil. The Mooney viscosity of these oil-extended copolymers may be from about 35 to about 80 or from about 45 to about 70.

In one or more embodiments, ethylene-propylene rubber may be characterized by having an intrinsic viscosity, as measured in Decalin at 135° C., up from about 2 dl/g to about 8 dl/g, or from about 3 dl/g to about 7 dl/g, or from about 4 dl/g to about 6.5 dl/g.

Ethylene-propylene rubber may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers suitable for use in the present invention are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), Nordel MG™ (DuPont Dow Elastomers), Royalene™ (Chemtura) and Buna™ (Lanxess).

Propylene-Based Rubbery Copolymers

In one or more embodiments, the propylene-based rubbery copolymer, which may also be referred to as a propylene-α-olefin copolymer, includes one or more units derived from propylene ("mer" units), one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or combinations thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5 wt %, in other embodiments at least 6 wt %, in other embodiments at least 8 wt %, and in other embodiments at least 10 wt % ethylene-derived units (i.e., ethylene mer units deriving from the polymerization of ethylene); in these or other embodiments, the copolymers may include up to 35 wt %, in other embodiments up to 32 wt %, in other embodiments up to 25 wt %, and in other embodiments up to 20 wt % ethylene-derived units, where the percentage by weight is based upon the total weight of the propylene-derived, α-olefin derived units, and diene-derived units. Stated another way, the propylene-based rubbery copolymers may include at least 75 wt %, or in other embodiments at least 80 wt %, propylene-derived units; and in these or other embodiments, the copolymers may include up to 95 wt %, in other embodiments up to 94 wt %, in other embodiments up to 92 wt %, and in other embodiments up to 90 wt % propylene-derived units, where the percentage by weight is based upon the total weight of the propylene-derived and diene-derived mer units.

In one or more embodiments, the propylene-based rubbery copolymers may include at least 0.5 wt %, in other embodiments at least 1.5 wt %, and in other embodiments at least 3 wt % diene-derived units; in these or other embodiments, the propylene-based rubbery copolymers may include up to 11 wt %, in other embodiments up to 6 wt %, and in other embodiments up to 4 wt % diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry ("DSC"). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ("$T_m$") of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C.

In one or more embodiments, the propylene-based rubbery copolymer may be characterized by a heat of fusion ("$H_f$"), as determined according to DSC procedures according to ASTM E 793. This may be determined by placing 6 to 10 mg of sample into DSC equipment and heating the sample at about 10° C./min. In one or more embodiments, the propylene-based rubbery copolymer may be characterized by a $H_f$ that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a $H_f$ that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%.

In one or more embodiments, the propylene-based rubbery copolymer may have a % crystallinity of from 0.5% to 40%, in other embodiments 1% to 30%, and in other embodiments 5% to 25%. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have a melt index in dg/min ("MI"), according to ASTM D-1238 at 2.16 kg and 190° C., of less than 10, in other embodiments $\leq 6.5$, in other embodiments $\leq 6$, in other embodiments $\leq 5.5$, and in other embodiments $\leq 5$.

In one or more embodiments, the propylene-based rubbery copolymer can have a melt flow rate ("MFR"), as measured according to the ASTM D-1238 at 2.16 kg weight and 230° C., equal to or greater than 0.2 dg/min, in other embodiments at least 0.2 dg/min, in other embodiments at least 0.5 dg/min, and in other embodiments at least 1.0 dg/min. In these or other embodiments, the MFR may be equal to or less than 350 dg/min, and in other embodiments less than 100 dg/min. In an embodiment, the propylene-based polymer has an MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML (1+4) @ 125° C.], as determined according to ASTM D1646, of less than 100, in other embodiments less than 75, in other embodiments less than 60, and in other embodiments less than 30.

In one or more embodiments, the propylene-based rubbery copolymer can have a Mw of about 5,000 to about 5,000,000 g/mole, in other embodiments a Mw of about 10,000 to about 1,000,000 g/mole, in other embodiments a Mw of about 20,000 to about 500,000, and in other embodiments a Mw of about 50,000 to about 400,000 g/mole.

In one or more embodiments, the propylene-based rubbery copolymer can have a Mn of about 2,500 to about 2,500,000 g/mole, in other embodiments a Mn of about 5,000 to about 500,000 g/mole, in other embodiments a Mn of about 10,000 to about 250,000, and in other embodiments a Mn of about 25,000 to about 200,000 g/mole.

In one or more embodiments, the propylene-based rubbery copolymer can have a Mz of about 10,000 to about 7,000,000 g/mole, in other embodiments a Mz of about 50,000 to about 1,000,000 g/mole, in other embodiments a Mz of about 80,000 to about 700,000 g/mole, and in other embodiments a Mz of about 100,000 to about 500,000 g/mole.

In one or more embodiments, the molecular weight distribution index (MWD=(Mw/Mn)) of the propylene-based rubbery copolymer may be about 1 to about 40, in other embodiments about 1 to about 5, in other embodiments about 1.8 to about 5, and in other embodiments about 1.8 to about 3. Techniques for determining the molecular weight (Mn and Mw) and molecular weight distribution (MWD) may be found in U.S. Pat. No. 4,540,753 (which is incorporated by reference herein for purposes of U.S. practice) and the references cited therein and in 21 Macromolecules, 3360 (1988) (Verstrate et al.) (which is herein incorporated by reference for purposes of U.S. practice) and the references cited therein.

In one or more embodiments, the ethylene-based plastomers, which may also be referred to as ethylene-α-olefin copolymers, include copolymers of ethylene and one or more α-olefin comonomers. The α-olefin comonomers may include 1-butene, 1-hexene, 1-octene, 1-nonene, 1-decene, 4-methyl-1-pentene, and mixtures thereof.

Ethylene-Based Plastomers

In one or more embodiments, the ethylene-based plastomers may include at least 15 wt %, in other embodiments at least 30 wt %, and in other embodiments at least 50 wt % units deriving from the α-olefin comonomer based plastomers upon the total weight of the copolymer. In these or other embodiments, the ethylene-based plastomers may include less than 55 wt %, in other embodiments less than 45 wt %, and in other embodiments less than 40 wt % units deriving from the α-olefin comonomer based upon the total weight of the copolymer.

In one or more embodiments, the ethylene-based plastomers may be characterized by a density, as determined at room temperature per ASTM D-792, that is less than 0.900 g/cm$^3$, in other embodiments less than 0.870 g/cm$^3$, in other embodiments less than 0.865 g/cm$^3$, and in other embodiments less than 0.860 g/cm$^3$; in these or other embodiments, the ethylene-α-olefin copolymers may be characterized by a density of at least 0.850 g/cm$^3$, and in other embodiments at least 0.860 g/cm$^3$.

In one or more embodiments, the ethylene-based plastomers may be characterized by a glass transition temperature ("$T_g$"), as determined by DSC, that is less than −20° C., in other embodiments less than −30° C., in other embodiments less than −50° C., and in other embodiments from about −20° C. to about −60° C.

In one or more embodiments, the ethylene-based plastomers can have a MI of less than 100 dg/min, in other embodiments less than 50 dg/min, in other embodiments less than 35 dg/min, in other embodiments less than 15 dg/min, and in other embodiments from about 0.1 dg/min to about 100 dg/min.

In one or more embodiments, the ethylene-based plastomers may be characterized by a narrow Compositional Distribution Breadth index, as determined by using the procedure set forth in WO 93/03093, above 60%, in other embodiments above 75%, and in other embodiments above 90%.

Thermoplastic Phase

As noted above, the uncured (or thermoplastic) phase (ii) includes a propylene thermoplastic polymer. The thermoplastic phase may also optionally include other thermoplastic polymers such as a low-crystallinity thermoplastic polymer, a functionalized thermoplastic polymer as well as other optional constituents. Inasmuch as the thermoplastic phase is not crosslinked, at least not to an appreciable extent, the thermoplastic phase can flow at temperatures above the $T_g$ or $T_m$ of the polymers included therein.

Propylene Thermoplastic Polymer

In one or more embodiments, the propylene thermoplastic polymer may be a propylene homopolymer or propylene copolymer. In one or more embodiments, the propylene thermoplastic polymer may be a mixture of more than one propylene-based thermoplastic polymer, such as propylene homopolymers and propylene-alpha-olefin (particularly ethylene) copolymer.

When propylene homopolymers is employed, the $T_m$ of the propylene homopolymer is preferably less than 200° C., in other embodiments less than 185° C., in other embodiments, less than 175° C. and in other embodiments less than 160° C. In one or more embodiments, the propylene polymer exhibits a MFR, according to ASTM D-1238, 230° C. and 2.16 kg, of from 0.1 dg/min to 25 dg/min, in other embodiments of from 0.25 dg/min to 20 dg/min, in other embodiments of from 0.5 dg/min to 15 dg/min and in other embodiments of from 0.75 dg/min to 12 dg/min. Particularly preferred high crystallinity isotactic or syndiotactic propylene homopolymers of high or ultra-high molecular weight and fractional MFR.

If a propylene copolymer, the copolymer will contain mer units derived from propylene and mer units derived from $C_2$ or $C_4$ to about $C_{20}$ α-olefins. The propylene thermoplastic polymer may, as is known in the art, be produced using any conventional polymerization process, such as solution, slurry or gas-phase processes using any suitable catalyst, such as a Ziegler-Natta or metallocene catalyst (either of which may be used with activators or co-catalysts and may be supported or unsupported) and with any suitable reactor system, such as a single or multiple reactor system. The selection of process, reactor and catalyst combination is well within the skill of one in the art. Methods for making and using metallocenes are well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790.

In one or more embodiments, the comonomer units derive from ethylene, butene, hexane, and/or octene. The embodiments described below are discussed with reference to ethylene as the comonomer, but the embodiments are equally applicable to other α-olefin comonomers including butene, hexene or octene. In this regard, the copolymer may be referred to as a propylene-ethylene copolymer.

In one or more embodiments, the propylene-ethylene copolymers may include at least 5 wt %, in other embodiments at least 6 wt %, in other embodiments at least 8 wt %, and in other embodiments at least 10 wt % ethylene-derived units. In these or other embodiments, the copolymers may include up to 35 wt %, in other embodiments up to 32 wt %, in other embodiments up to 25 wt %, and in other embodiments up to 20 wt % ethylene-derived units, where the percentage by weight is based upon the total weight of the propylene-derived and ethylene-derived units. Stated another way, the homogeneous propylene-ethylene copolymers may include at least 75 wt %, or in other embodiments at least 80 wt %, propylene-derived units; and in these or other embodiments, the copolymers may include up to 95 wt %, in other embodiments up to 94 wt %, in other embodiments up to 92 wt %, and in other embodiments up to 90 wt % propylene-derived units, where the percentage by weight is based upon the total weight of the propylene-derived and ethylene-derived units.

In one or more embodiments, the propylene-ethylene copolymer includes less than 0.5 wt % (including zero), in other embodiments less than 0.1 wt %, in other embodiments less than 0.05 wt %, or in other embodiments less than 0.01 wt % diene-derived units. In one or more embodiments, the propylene-ethylene copolymer is substantially devoid or substantially free of diene-derived units, where substantially devoid refers to that amount of diene-derived units or less that has no appreciable impact on the copolymer. In one or more embodiments, the propylene-ethylene copolymers are devoid of diene-derived units. In one or more embodiments, these propylene-ethylene copolymers may be referred to as non-crosslinkable propylene-ethylene copolymer.

The propylene based polymers in one or more embodiments of this invention are characterized by having a single melting temperature as determined by DSC. In one or more embodiments, the $T_m$ of the propylene-ethylene copolymer is less than 110° C., in other embodiments less than 90° C., in other embodiments less than 80° C., and in other embodiments less than 70° C.; in these or other embodiments, the ethylene-propylene copolymer has a $T_m$ of at least 25° C., in other embodiments at least of 35° C., in other embodiments at least of 40° C., and in other embodiments at least of 45° C.

In one or more embodiments, the propylene-ethylene copolymer may be characterized by a $H_f$ that is at least 0.5 J/g, in other embodiments at least 1.0 J/g, in other embodiments at least 1.5 J/g, in other embodiments at least 3.0 J/g, in other embodiments at least 4.0 J/g, in other embodiments at least 6.0, and in other embodiments at least 7.0 J/g. In these or other embodiments, the propylene-ethylene copolymer may be characterized by a $H_f$ that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-ethylene copolymer can have a triad tacticity of three propylene units of 75%, or greater, 80% or greater, 82% or greater, 85% or greater, or 90% or greater. In one or more embodiments, ranges include from about 50% to about 99%, in other embodiments from about 60% to about 99%, in other embodiments from about 75% to about 99%, in other embodiments from about 80 to about 99%, and in other embodiments from about 60% to about 97%.

In one or more embodiments, the propylene-ethylene copolymer may have a % crystallinity of from 0.5% to 40%, in other embodiments 1% to 30%, and in other embodiments 5% to 25%. Crystallinity may be determined according to DSC procedures. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-ethylene copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-1505 test method.

In one or more embodiments, the propylene-ethylene copolymer can have a MI of less than 7, in other embodiments less than 6.5, in other embodiments less than 6, in other embodiments less than 5.5, and in other embodiments less than 5.

In one or more embodiments, the propylene homopolymer or propylene-ethylene copolymer can have a MFR equal to or greater than 0.1 dg/min, in other embodiments of at least 0.2 dg/min, in other embodiments at least 0.5 dg/min, and in other embodiments at least 1.0 dg/min. In these or other embodiments, the MFR may be equal to or less than 200 dg/min, and in other embodiments less than 100 dg/min. In an embodiment, the propylene-based polymer has an MFR of 0.1 dg/min to 200 dg/min, in other embodiments from 2 dg/min to 30 dg/min, in other embodiments from 5 dg/min to 30 dg/min, in other embodiments 10 dg/min to 30 dg/min, in other embodiments 10 dg/min to about 25 dg/min and in other embodiments 0.1 dg/min to 50 dg/min.

In one or more embodiments, the propylene-ethylene copolymer may have a Mooney viscosity [ML (1+4) @ 125°

C.] of less than 100, in other embodiments less than 75, in other embodiments less than 60, and in other embodiments less than 30.

In one or more embodiments, the propylene-ethylene copolymer can have a Mw of about 5,000 to about 5,000,000 g/mole, in other embodiments a Mw of about 10,000 to about 1,000,000, in other embodiments a Mw of about 20,000 to about 500,000, and in other embodiments a Mw of about 50,000 to about 400,000.

In one or more embodiments, the propylene-ethylene copolymer can have a Mn of about 2,500 to about 2,500,000 g/mole, in other embodiments a Mn of about 5,000 to about 500,000, in other embodiments a Mn of about 10,000 to about 250,000, and in other embodiments a Mn of about 25,000 to about 200,000.

In one or more embodiments, the propylene-ethylene copolymer can have a Mz of about 10,000 to about 7,000,000 g/mole, in other embodiments a Mz of about 50,000 to about 1,000,000, in other embodiments a Mz of about 80,000 to about 700,000, and in other embodiments a Mz of about 100,000 to about 500,000.

In one or more embodiments, the MWD of the propylene-ethylene copolymer may be about 1 to about 40, in other embodiments about 1 to about 5, in other embodiments about 1.8 to about 5, and in other embodiments about 1.8 to about 3.

Propylene-ethylene copolymers suitable for use in the present invention are available commercially under the tradenames Vistamaxx™ (ExxonMobil Chemical Company, Houston, Tex., USA) and Versify™ (The Dow Chemical Company, Midland, Mich., USA).

In one or more embodiments, the propylene-ethylene copolymer may be functionalized. In other words, the propylene-ethylene copolymer may include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, epoxide, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the propylene-ethylene copolymer. In one or more embodiments, the functionalized propylene-ethylene copolymer may be prepared by using methods set forth in U.S. Pat. No. 6,884,850.

Low-Crystallinity Thermoplastic Polymers

As noted above, the uncured phase may also include low-crystallinity thermoplastic polymers characterized by low crystallinity and low flexural modulus. In one or more embodiments, low crystallinity thermoplastic polymers may include those thermoplastic polymers that may be characterized by a crystallinity that is less than 25%, in other embodiments less than 23%, and in other embodiments less than 20%; in these or other embodiments, the low-crystallinity thermoplastic polymer may be characterized by a crystallinity in excess of 2%, in other embodiments in excess of 3%, and in other embodiments in excess of 5%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In one or more embodiments, where the low-crystallinity thermoplastic polymer is propylene-based, the polymer may be characterized by a heat of fusion of less than 50 J/g, in other embodiments less than 40 J/g, and in other embodiments less than 30 J/g. Where the low-crystallinity thermoplastic polymer is ethylene-based, the polymer may be characterized by a heat of fusion of less than 160 J/g, in other embodiments less than 140 J/g, and in other embodiments less than 120 J/g.

Some exemplary low-crystallinity thermoplastic polymers include reactor blend polyolefins, impact copolymers, and mixtures thereof. These low-crystallinity thermoplastic polymers may be prepared by copolymerizing ethylene and/or α-olefins. This polymerization may include sequential or in-situ polymerization Low-crystallinity thermoplastic polymers suitable for use in the present invention are commercially available, for example, impact copolymers having a crystallinity of less than about 25 weight percent may be obtained under the tradename ADFLEX™ KS359P (Basell Polyolefins). Blends that include about 84 wt % ethylene-propylene rubber, about 5 wt % ethylene propylene copolymer, and about 11 wt % random polypropylene, with the overall blend having a crystallinity of about 5% to about 15%, can be obtained under the tradename SOFTELL™ CAO2A (Basell Polyolefins).

Other Constituents

In one or more embodiments, the thermoplastic vulcanizates may include a rubber processing oil, such as a mineral oil, a synthetic oil or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a Mn of from about 300 to about 9,000 g/mole, and in other embodiments from about 700 to about 1,300 g/mole. In one or more embodiments, these oligomers include isobutenyl mer units. Exemplary synthetic oils include polyisobutylene, poly (isobutylene-co-butene), polybutadiene, poly(butadiene-co-butene), and mixtures thereof. In one or more embodiments, synthetic oils may include polylinear α-olefins, poly-branched α-olefins, hydrogenated poly-α-olefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename SPECTRASYN™ (ExxonMobil), formerly SHF Fluids (Mobil).

In one or more embodiments, the extender oils may include organic esters, alkyl ethers. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In certain embodiments, the thermoplastic vulcanizates may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers.

In one or more embodiments, the thermoplastic vulcanizates of this invention may optionally include a functionalized tackifier resin. Functionalized tackifier resins, which may also be referred to as a functionalized hydrocarbon resin, include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin.

In one or more embodiments, the functionalized tackifier resins include grafted hydrocarbon resins as disclosed in U.S. Patent Publication Nos. 2004/0260021 A1 and 2004/0266947 A1, which are incorporated herein by reference. Grafted hydrocarbon resins, which may also be referred to as grafted tackifier resins, may include grafted synthetic resins, grafted synthetic oligomers, and/or grafted natural resins, or a combination thereof. Grafted hydrocarbon resins can result from a grafting process, which includes combining, contacting, or reacting a hydrocarbon resin with a graft monomer.

The hydrocarbon resins that may be grafted may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1,3-hexadiene, 1,4-hexadiene, cyclopentadiene, and dicyclopentadiene. Aromatic monomer can include $C_8$, $C_9$, and $C_{10}$ aromatic monomer. Examples of aromatic monomer include styrene, indene, derivatives of styrene, derivatives of indene, and combinations thereof.

Examples of these resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

The synthetic aliphatic or aromatic hydrocarbon resins that can be grafted may be characterized by a Mn of from about 400 g/mole to about 3,000 g/mole, and in other embodiments from about 500 g/mole to about 2,000 g/mole. These hydrocarbon resins may also be characterized by a Mw of from about 500 g/mole to about 6,000 g/mole, and in other embodiments from about 700 g/mole to about 5,000 g/mole. Still further, these hydrocarbon resins may be characterized by a Mz of from about 700 g/mole to about 15,000 g/mole, and in other embodiments from about 8,000 g/mole to about 12,000 g/mole.

Grafted synthetic oligomers may include dimers, trimers, tetramers, pentamers, hexamers, septamers, and octamers of petroleum distillate monomer. In one or more embodiments, this petroleum distillate monomer may have a boiling point of from about 30° C. to about 210° C. The oligomers may include byproducts of resin polymerization including thermal and catalytic polymerization. For example, oligomers may derive from processes where DCPD, aliphatic monomer, and/or aromatic monomer are oligomerized and then grafted.

The hydrocarbon resins that can be grafted may include those characterized by an aromatic content of from about 1 to about 60%, in other embodiments from about 2 to about 40%, and in other embodiments from about 5 to about 10%. Also, the hydrocarbon resins that can be grafted may be at least partially hydrogenated. For example, the hydrocarbon resin prior to grafting may contain less than 90%, in other embodiments less than 50%, in other embodiments less than 25%, in other embodiments less than 10%, in other embodiments less than 2%, in other embodiments less than 1%, in other embodiments less than 0.5%, and in other embodiments less than 0.05% olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the graft monomers, which may be grafted to the hydrocarbon resin, may include unsaturated organic compounds containing at least one olefinic bond and at least one polar group. In certain embodiments, the organic compound may contain ethylenic unsaturation conjugated with a carbonyl group. Examples of graft monomers include acids, alcohols, anhydrides, imides, amides, and derivatives thereof including carboxylic acids, acid halides or anhydrides, alcohols (phenols, mono-alcohols, diols, and polyols), and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Particular examples include maleic anhydride, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyle itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylamaleimide, sodium acrylate, sodium methacrylate, potassium acrylate and potassium methacrylate.

Grafting of the grafting monomer to the hydrocarbon resin may take place in the presence of a free-radical initiator using suitable conditions. These processes are described in U.S. Patent Publication Nos. 2004/0260021 A1 and 2004/0266947 A1, which are incorporated herein by reference.

In one or more embodiments, the amount of grafting monomer combined with the hydrocarbon resin may be represented as a mole ratio of graft monomer to resin of from about 0.1:1 to about 1:1, in other embodiments from about 0.2:1 to about 0.9:1, and in other embodiments from about 0.3:1 to about 0.8:1. Where the grafting monomer is grafted to an oligomer, the amount of grafting monomer combined with the oligomer may be represented as a mole ratio of graft monomer to oligomer of from about 0.2:1 to about 5:1, in other embodiments from about 0.5:1 to about 3:1, and in other embodiments from about 0.8:1 to about 1.5:1.

The resulting grafted hydrocarbon resin may be characterized by a softening point of from about 15° C. to about 210° C., in other embodiments from about 65° C. to about 170° C., and in other embodiments from about 90° C. to about 140° C. Softening point can be determined according to ASTM E-28 (Revision 1996). In these or other embodiments, the resulting grafted hydrocarbon resin may be characterized by a $T_g$ less than 120° C., in other embodiments less than 110° C., and in other embodiment from about 60° C. to about 80° C. $T_g$ may be determined according to ASTM D 341-88 by using differential scanning calorimetry. In these or other embodiments, the resulting grafted hydrocarbon resin may be characterized by a Saponification number (mg KOH/g resin material) of greater than 10, in other embodiments greater than 15, and in other embodiments greater than 19. In these or other embodiments, the resulting grafted hydrocarbon resin may be characterized by an acid number greater than 10, in other embodiments greater than 15, and in other embodiments greater than 20, and in other embodiments greater than 25.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150% or less of their original length within about 10 minutes after being stretched to 200% of their original length and held at 200% of their original length for about 10 minutes.

Thus, in one or more embodiments, the thermoplastic vulcanizates can include at least about 25 wt %, in other embodiments at least about 45 wt %, in other embodiments at least about 65 wt %, and in other embodiments at least about 75 wt % rubber. In these or other embodiments, the amount of rubber within the thermoplastic vulcanizates can be from about 15 wt % to about 90 wt %, in other embodiments from about 45 wt % to about 85 wt %, and in other embodiments from about 60 wt % to about 80 wt %, based on the entire weight of the rubber and thermoplastic combined, where the thermoplastic refers to all thermoplastic components of the thermoplastic phase.

In one or more embodiments, the amount of thermoplastic polymer (including all thermoplastic components) within the thermoplastic vulcanizates can be from about 10 wt % to about 85 wt %, in other embodiments from about 15 wt % to about 55 wt % and in other embodiments from about 20 wt % to about 40%, based on the entire weight of the rubber and all thermoplastic components combined.

In one or more embodiments, the thermoplastic vulcanizates may include from about 3 wt % to about 60 wt %, in other embodiments from about 7 wt % to about 45 wt %, and in other embodiments from about 10 wt % to about 30 wt % propylene thermoplastic polymer based upon the total weight of the rubber and thermoplastic component combined. Stated with respect to each 100 parts of rubber ("phr"), the thermoplastic vulcanizates of the present invention may include from about 5 phr to about 500 phr, in other embodiments from about 25 phr to about 400 phr, and in other embodiments from about 50 phr to about 250 phr propylene thermoplastic polymer.

In those embodiments where the thermoplastic vulcanizates of this invention include a functionalized tackifier resin, the thermoplastic vulcanizates may include from about 0 phr to about 50 phr, in other embodiments from about 7 phr to about 40 phr, and in other embodiments from about 15 phr to about 35 phr functionalized tackifier resin.

With respect to the oil, the thermoplastic vulcanizate may include from about 0 phr to about 250 phr, or from about 50 phr to about 150 phr, or from about 75 phr to about 130 phr, of extender oil. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 phr to about 200 phr, in other embodiments from about 2 phr to about 100 phr, and in other embodiments from about 3 phr to about 50 phr filler. The amount of carbon black that can be used may depend, at least in part, upon the type of carbon black and the amount of extender oil that is used.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one embodiment, the rubber can be simultaneously cured and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are well known, as are methods employing low shear rates. Multiple-step processes can also be employed whereby ingredients, such as additional thermoplastic resin or tackifier resins, can be added after dynamic vulcanization has been achieved. The skilled artisan will be able to readily determine a sufficient or effective amount of vulcanizing agent to be employed without undue calculation or experimentation.

Any cure agent that is capable of curing or crosslinking the rubber employed in preparing the thermoplastic vulcanizate may be used. For example, where the rubber includes an olefinic elastomeric copolymer, the cure agent may include peroxides, phenolic resins, free radical curatives, silicon-containing curatives (sometimes referred to as "hydrosilylation agents"), or other curatives conventionally employed, and known to those of skill in the art, in preparing thermosets.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with $C_1$ to $C_{10}$ alkyl groups are preferred. In one embodiment, a blend of octyl phenol and nonylphenol-formaldehyde resins are employed. The blend includes from about 25 wt % to about 40 wt % octyl phenol and from about 75 wt % to about 60 wt % nonylphenol, more preferably, the blend includes from about 30 wt % to about 35 wt % octyl phenol and from about 70 wt % to about 65 wt % nonylphenol. In one embodiment, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

An example of a phenolic resin curative includes that defined according to the general formula

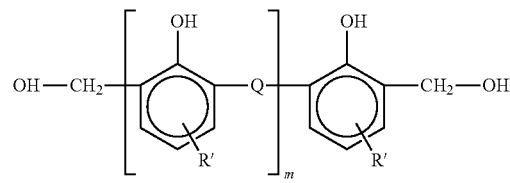

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 5 and R' is an organic radical having between 4 and 12 carbon atoms.

In one or more embodiments, the phenolic resin is used in conjunction with a halogen source, such as stannous chloride, and/or metal oxide or reducing compound such as zinc oxide.

Free-radical cure agents include peroxides such as organic peroxides. Examples of organic peroxides include, but are not limited to, di-tert-butyl peroxide, dicumyl peroxide, t-butyl-cumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

The free-radical curative may be used in conjunction with a coagent. Useful coagents include high-vinyl polydiene or polydiene copolymer, triallylcyanurate, triallyl isocyanurate, triallyl phosphate, sulfur, N-phenyl bis-maleamide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multifunctional acrylate esters, multi-functional methacrylate eaters or a combination thereof, or oximers such as quinone dioxime.

Silicon-containing cure agent systems may include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof. A preferred silicon hydride cure agent is commercially available from Dow Chemical under the tradename Silicone Fluid 2-5084.

Useful catalysts for hydrosilylation include, but are not limited to, peroxide catalysts and catalysts including transition metals of Group VIII. These metals include, but are not limited to, palladium, rhodium, and platinum, as well as complexes of these metals.

Where butyl rubber is employed in preparing the thermoplastic vulcanizate, the cure agents may include phenolic resins, silicon-containing cure systems, zinc oxide systems, and amine systems.

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 10 wt %, in other embodiments not more than 6 wt %, in other embodiments not more than 5 wt %, and in other embodiments not more than 3 wt % is extractable by cyclohexane at 23° C. as described in U.S. Pat. Nos. 5,100,947 and 5,157,081, (incorporated herein by reference for purpose of U.S. patent practice). Alternatively, in one or more embodiments, the rubber has a degree of cure (dynamically-cured in a preferred embodiment) such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., 68 *Rubber Chemistry and Technology* 573-584 (1995).

The cure agent is preferably present in an amount effective to produce the desired amount of cure within the rubber phase. In certain embodiments, the cure agent is present in an amount of from 0.01 phr to 50 phr, in other embodiments of from 0.05 phr to 40 phr, in other embodiments of from 0.1 phr to 30 phr, in other embodiments of from 0.5 phr to 25 phr, in other embodiments of from 1.0 phr to 20 phr, in other embodiments of from 1.5 phr to 15 phr, and in other embodiments of from 2.0 phr to 10 phr.

Despite the fact that the rubber may be partially or fully cured, the compositions of this invention can be processed and reprocessed by conventional plastic processing techniques such as thermoforming operations, extrusion, injection molding, blow molding, injection-compression molding, compression molding and rotational molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

The thermoplastic vulcanizates of this invention may be useful in forming a number of articles or devices of commerce. For example, numerous articles and devices for consumer applications can be prepared. This may include automobile parts, including exterior and interior trim pieces, instrument panels, interior knee pads, brake parts such as cups, coupling disks and diaphragm cups, boots for constant velocity joints and rack and pinion joints, hydraulically or pneumatically operated equipment parts, body plugs and door panels. Other industrial uses include o-rings, valve seats, valve guides. Consumer applications include grips or gripable surfaces on a number of consumer goods including, for example, kitchen utensils, tools, toothbrushes, pens and pencils, and athletic equipment. The thermoplastic vulcanizates may also be used in numerous damping applications such as in the formation of gaskets, bumpers, housings, motor mounts and the like. Further applications may include, for example, seals, including weather seal components, in the automotive, and construction industries, furniture spacers and cable grommets. Other applications may include hoses, belts, boots, elastic fibers and the like.

In order to demonstrate the practice of the present invention, the following examples have been prepared and tested. The examples should not, however, be viewed as limiting the scope of the invention. The claims will serve to define the invention.

In another embodiment, this invention relates to:

A. A process for increasing the $T_c$ of a thermoplastic vulcanizate composition comprising
preparing a thermoplastic vulcanizate premix comprising a propylene polymer thermoplastic, a rubber and a cure agent;
substantially vulcanizing the thermoplastic vulcanizate premix to form a thermoplastic vulcanizate;
introducing an effective amount of a crystallization agent to the thermoplastic vulcanizate; and
melt mixing the crystallization agent and the thermoplastic vulcanizate to achieve a distribution of the crystallization agent within the thermoplastic vulcanizate,
wherein the $T_c$ of the thermoplastic vulcanizate is at least 6° C. greater than that of the thermoplastic vulcanizate absent the crystallization agent.

B. The process of embodiment A, wherein the $T_c$ of the thermoplastic vulcanizate is at least 7° C., at least 8° C., at least 10° C., at least 12° C. or at least 14° C. greater than that of the thermoplastic vulcanizate absent the crystallization agent.

C. The process of any of the preceding embodiments, wherein the substantially vulcanizing step is accomplished by dynamic vulcanization.

D. The process of any of the preceding embodiments, wherein the cure agent is a(n) free-radical cure agent, hydrosilylation agent, phenolic resin, amine agent or combinations thereof.

E. The process of any of the preceding embodiments, wherein the cure agent is a(n) alkylphenol-formaldehyde resin, alkylsiloxane, stannous chloride, organic peroxide, polysiloxane or bis(dimethylsilyl)benzene.

F. The process of any of the preceding embodiments, wherein the crystallization agent is present in the amount of from 0.05 wt % to 1.0 wt %, from 0.1 wt % to 0.5 wt % or from 0.2 wt % to 0.35 wt % based on the total weight of the thermoplastic elastomer composition.

G. The process of any of the preceding embodiments, wherein the propylene polymer thermoplastic is polypropylene, propylene ethylene copolymer, propylene $C_4$-$C_{20}$ alpha-olefin copolymer or mixtures thereof.

H. The process of any of the preceding embodiments, wherein the propylene polymer thermoplastic exhibits a MFR of from 0.1 dg/min to 50 dg/min.

I. The process of any of the preceding embodiments, wherein the rubber is EPM rubber, EPDM rubber, butyl rubber, halogenated butyl rubber, polybutadiene or halogenated copolymers of isobutylene and para-methylstyrene.

J. The process of any of the preceding embodiments, wherein the propylene polymer is present in the thermoplastic vulcanizate an amount of from 5 phr to 500 phr and the cure agent is present in the thermoplastic vulcanizate an amount of from 0.1 phr to 15 phr.

K. The process of any of the preceding embodiments, wherein the preparing, substantially vulcanizing, introducing and melt mixing steps all occur in a single pass through a processing device.

L. The process of any of the preceding embodiments, wherein the preparing and substantially vulcanizing steps occur in a first pass through a first processing device and the introducing and melt mixing steps occur in a second pass through a second processing device.

M. The process of embodiment L, wherein the first and second processing devices are a single processing device.

N. A process for increasing the $T_c$ of a thermoplastic vulcanizate composition comprising
preparing a substantially dynamically vulcanized thermoplastic vulcanizate comprising a propylene polymer thermoplastic, a rubber and a cure agent; and
introducing an effective amount of a crystallization agent to the thermoplastic vulcanizate;
wherein the $T_c$ of the thermoplastic vulcanizate is at least 6° C. greater than that of the thermoplastic vulcanizate absent the crystallization agent and wherein the preparing and introducing steps occur in a single pass through a processing device.

O. The process of embodiment N, wherein the $T_c$ of the thermoplastic vulcanizate is at least 8° C., at least 10° C., at least 12° C. or at least 14° C. greater than that of the thermoplastic vulcanizate absent the crystallization agent.

P. The process of any of the preceding embodiments, wherein the processing device is a Banbury mixer, Buss co-kneader, Farrel continuous mixer, planetary extruder, single screw extruder, co-rotating multi-screw screw extruder, counter-rotating multi-screw screw extruder, co-rotating intermeshing extruder or ring extruder.

Q. The process of any of the preceding embodiments, wherein the crystallization agent is a nucleating agent.

R. The process of any of the preceding embodiments, wherein the nucleating agent is a carboxylate salt, phosphate ester salt, sorbitol acetal compound or dibenzylidene sorbitol compound.

S. The process of any of the preceding embodiments, wherein the nucleating agent is a dibenzylidene sorbitol compound.

T. The process of any of the preceding embodiments, further comprising adding one or more additives to the thermoplastic vulcanizate premix selected from reinforcing fillers, non-reinforcing fillers, antioxidants, stabilizers, rubber processing oils, rubber/thermoplastic compatibilizing agents, lubricants, antiblock agents, antistatic agents, waxes, coupling agents, foaming agents, pigments or flame retardants.

U. The process of any of embodiments N-T, further comprising, after the melt mixing step, shaping the thermoplastic vulcanizate to form a shaped article.

V. The process of embodiment U, wherein the shaped article is selected from grips or grippable surfaces on consumer goods, gaskets, housings, seals, motor mounts, automobile exterior trim pieces, interior trim pieces, instrument panels, bumper fascia, body plugs, interior knee pads, weather seal components and door panels.

W. The process of any of embodiments U-V, wherein the shaped article is shaped by thermoforming, extrusion, blow molding, injection molding, compression molding, injection-compression molding, or rotational molding.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

EXAMPLES

All example materials herein were prepared on a co-rotating, fully intermeshing, twin screw extruder, supplied by Coperion Corporation, Ramsey, N.J., was used, following the method described in U.S. Pat. No. 4,594,391. The extruder had an L/D ratio of 44, used screws having 3 lobes and was composed of 12 barrel sections and a die section. A screw design with several mixing sections consisting of a combination of forward convey, neutral, and left handed kneading blocks, suitable to mix the process oil and provide sufficient residence time and shear for completing the cure reaction were used. The catalyst, thermoplastic, and cross-linkable thermoplastic elastomer were added in the feed throat. The phenolic resin curing agent, diluted in oil, was injected into the first 40% of the extruder, and additional process oil (plasticizer) was added before the cure addition, during the cure, and at one location after the substantial completion of cure. The crystallization agent, carboxylate salt (specifically a disodium salt of rel-(1R,2R,3S,4S)-bicyclo[2.2.1]heptane-2,3-dicarboxylic acid) commercially available from Milliken Chemical under the trade name Hyperform® HPN-68L, was injected at various points along the extruder for comparison purposes. The locations of crystallization agent addition for each example are noted in the tables below and include upstream (i.e, at the feed throat) and downstream (after curing is substantially complete). The crystallization agent was alternatively added (1) neat, (2) via suspension in a process oil, (3) as a 3.3 wt. % masterbatch blended with ExxonMobil 7032 propylene impact copolymer (hereinafter "HPN-ICP MB") or (4) as a 5 wt. % masterbatch compounded with polypropylene (available commercially from Milliken Chemical under the trade name Hyperform® HI5-5). The extruded materials were fed into the extruder at a rate of 70 kg/hr. The extrusion mixing was carried out at 350 RPM. A barrel metal temperature profile in ° C., starting from barrel section 2 down towards the die to barrel section 12 of 160/160/160/160/165/165/165/165/180/180/180/200 (wherein the last value is for the die) was used. Low molecular contaminants, reaction by-products, residual moisture and the like were removed by venting through one or more vent ports, typically under vacuum, as needed.

For purposes of the examples, the following test procedures were used.

"Hardness" is the hardness of the TPV, measured in Sh A or Sh D units in accordance with ASTM D2240.

"UTS" is the ultimate tensile strength, and is given is force per unit area in accordance with ASTM D412 (ISO 37 type 2).

"M100" is the modulus of the material, and the M100 test indicates resistance to strain at 100% extension in force per unit area in accordance with ASTM D412 (ISO 37 type 2).

"UE" is ultimate elongation, and indicates the distance a strand of the material can be stretched before it breaks in accordance with ASTM D412 (ISO 37 type 2).

"Wt. Gain" is a measurement of the amount of oil absorbed by the sample in an oil swell resistance test. Such a test is shown in U.S. Pat. No. 6,150,464. The test is based on ASTM D471 and ISO 1817, and requires a sample of TPV to be immersed in IRM 903 oil for 24 hours at 121° C. The weight gain percentage is a measure of the completeness of the cross-linking of the vulcanizate. Although weight gain values can vary depending on whether or not the elastomer is oil extended, and how much, in TPVs having the same composition, the values show the amount of cross-linking of the vulcanizates relative to each other.

"LCR" is a measurement of viscosity in Pa-sec at 1200 sec-1 shear rate using Lab Capillary Rheometer from Dynisco, per method described in ASTM D 3835.

"ESR" is a measure of the surface smoothness of the TPV, where lower numbers indicate a smoother surface. The ESR was measured using a Surfanalizer, supplied by Federal, in accordance with the manufacturer's instructions "Compression set" is a measure of the permanent deformation of TPV when it is compressed. The test method is based on ISO 815:1991. A test specimen conforming to Type A requirements in ISO 815 with dimensions 29+0.5 mm diameter and 12.5+0.5 mm thickness are cut and stacked from and injection molded plaques, each of thickness 2.03 mm. The sample is compressed to 75% (for Sh A hardness<75) of its original height for 22 hrs at 70° C. The sample is then allowed to relax at 23° C. for about 30 minutes. The change in height of the original specimen is measured and the Comp. Set % is calculated according to the formula:

% Compression set=100×(Initial thickness−Final thickness)/(Initial thickness−spacer thickness− thickness of shims and/or foils)

TABLE 1

Thermoplastic Vulcanizates Runs 1-4

| Raw Material | Barrel # | Run 1 C None PHR | Run 2 C None PHR | Run 3 C Upstream PHR | Run 4 I Downstream PHR |
|---|---|---|---|---|---|
| ExxonMobil Vistalon 3666 EPDM | 1 | 175.00 | 175.00 | 175.00 | 175.00 |
| Burgess Pigment Co. Icecap K (anhydrous kaolin clay) | 1 | 12.00 | 12.00 | 12.00 | 12.00 |
| ZnO | 1 | 1.94 | 1.94 | 1.94 | 1.94 |
| SnCl2 | 1 | 1.26 | 1.26 | 1.26 | 1.26 |
| Ampacet Corp. 49974 Carbon Black Masterbatch | 1 | 32.07 | 32.07 | 32.07 | 32.07 |
| Sunoco F180A (propylene homopolymer) | 1 | 60.92 | 60.92 | 60.92 | 60.92 |
| ExxonMobil 7032 E2 (propylene impact copolymer) | 1 | 68.90 | 34.45 | — | — |
| Cycle 5000 Masterbatch in 7032 E2 PP ICP | 1 | — | — | — | 41.49 |
| HPN-ICP MB | 1 | — | — | 35.62 | — |
| RKFM3903 (CYC-HPN-7032 MB) | 1 | — | — | — | — |
| Sunoco Sunpar 150M (process oil) | 2D | 10.00 | 10.00 | 10.00 | 10.00 |
| Schenectady International Inc. HRJ-14247A (Phenolic Resin Cure Agent in Oil) | 4D | 12.37 | 12.37 | 12.37 | 12.37 |
| Sunoco Sunpar 150M (process oil) | 8D | 86.94 | 86.94 | 86.94 | 86.94 |
| ExxonMobil 7032 E2 (propylene impact copolymer) | 9D | — | 34.45 | 34.45 | — |
| Cycle 5000 Masterbatch in 7032 E2 PP ICP | 9D | — | — | — | — |
| HPN-ICP MB | 9D | — | — | — | 35.62 |
| RKFM3903 (CYC-HPN-7032 MB) | 9D | — | — | — | — |
| EZ Color, Corp. Cycle 5000 | 1 | — | — | — | — |
| HPN-68L | 1 | — | — | — | — |
| Total | | 461.40 | 461.40 | 462.57 | 469.61 |
| Porosity | | 0 | 0 | 0 | 0 |
| Moisture (%) | | 0.014 | 0.012 | 0.060 | 0.030 |
| Hardness (Shore A) | | 86.8 | 87.3 | 86.7 | 87.8 |
| S.G. | | 0.9185 | 0.9185 | 0.9121 | 0.9297 |

TABLE 1-continued

Thermoplastic Vulcanizates Runs 1-4

| | | Run Number | | | |
|---|---|---|---|---|---|
| | | 1 | 2 | 3 | 4 |
| | | Inventive (I) or Comparative (C) | | | |
| | | C | C | C | I |
| | | Location of HPN-68L Addition | | | |
| Raw Material | Barrel # | None PHR | None PHR | Upstream PHR | Downstream PHR |
| UTS (psi) | | 859 | 836 | 796 | 755 |
| UE (%) | | 320 | 270 | 373 | 255 |
| M100 (psi) | | 645 | 680 | 603 | 648 |
| Wt. Gain (%) | | 61.4 | 57.9 | 87.7 | 71.0 |
| LCR @ 1200/s (Pa · s) | | 44.3 | 43.7 | 47.5 | 42.5 |
| ESR (Ra, μin.) | | 29 | 45 | 25 | 31 |
| $T_c$ (° C.) | | 110.23 | 110.45 | 115.43 | 121.75 |
| Comp. Set (%) 22 hours @ room temp | | 32.8 | 30.1 | 34.9 | 33.2 |
| Comp. Set (%) 22 hours @ 70° C. | | 49.5 | 44.9 | 55.3 | 51.1 |

TABLE 2

Thermoplastic Vulcanizates Runs 5-8

| | | Run Number | | | |
|---|---|---|---|---|---|
| | | 5 | 6 | 7 | 8 |
| | | Inventive (I) or Comparative (C) | | | |
| | | I | I | C | C |
| | | Location of HPN-68L Addition | | | |
| Raw Material | Barrel # | Downstream PHR | Downstream PHR | None PHR | Upstream PHR |
| ExxonMobil Vistalon 3666 EPDM | 1 | 175.00 | 175.00 | 175.00 | 175.00 |
| Burgess Pigment Co. Icecap K (anhydrous kaolin clay) | 1 | 12.00 | 12.00 | 12.00 | 12.00 |
| ZnO | 1 | 1.94 | 1.94 | 1.94 | 1.94 |
| SnCl2 | 1 | 1.26 | 1.26 | 1.26 | 1.26 |
| Ampacet Corp. 49974 Carbon Black Masterbatch | 1 | 32.07 | 32.07 | 32.07 | 32.07 |
| Sunoco F180A (propylene homopolymer) | 1 | 60.92 | 60.92 | 60.92 | 60.92 |
| ExxonMobil 7032 E2 (propylene impact copolymer) | 1 | 34.45 | 34.45 | 34.45 | 68.90 |
| Cycle 5000 Masterbatch in 7032 E2 PP ICP | 1 | — | — | — | — |
| HPN-ICP MB | 1 | — | — | — | — |
| HPN-68L Masterbatch 3.3 wt % in 7032 E2 PP ICP (with Cycle 5000) | 1 | — | — | — | — |
| Sunoco Sunpar 150M (process oil) | 2D | 10.00 | 10.00 | 10.00 | 10.00 |
| Schenectady International Inc. HRJ-14247A (Phenolic Resin Cure Agent in Oil) | 4D | 12.37 | 12.37 | 12.37 | 12.37 |
| Sunoco Sunpar 150M (process oil) | 8D | 86.94 | 86.94 | 86.94 | 86.94 |

TABLE 2-continued

Thermoplastic Vulcanizates Runs 5-8

| | | Run Number | | | |
|---|---|---|---|---|---|
| | | 5 | 6 | 7 | 8 |
| | | Inventive (I) or Comparative (C) | | | |
| | | I | I | C | C |
| | | Location of HPN-68L Addition | | | |
| Raw Material | Barrel # | Downstream PHR | Downstream PHR | None PHR | Upstream PHR |
| ExxonMobil 7032 E2 (propylene impact copolymer) | 9D | — | — | 34.45 | — |
| Cycle 5000 Masterbatch in 7032 E2 PP ICP | 9D | — | — | — | — |
| HPN-ICP MB | 9D | 35.62 | — | — | — |
| HPN-68L Masterbatch 3.3 wt % in 7032 E2 PP ICP (with Cycle 5000) | 9D | — | 42.66 | — | — |
| EZ Color, Corp. Cycle 5000 | 1 | — | — | — | 7.04 |
| HPN-68L | 1 | — | — | — | 1.17 |
| Total | | 462.57 | 469.61 | 461.40 | 469.61 |
| Porosity | | 0 | 0 | 0 | 11 |
| Moisture (%) | | 0.043 | 0.039 | 0.022 | 0.052 |
| Hardness (Shore A) | | 87.3 | 86.6 | 87.0 | 87.9 |
| S.G. | | 0.9134 | 0.9179 | 0.9166 | 0.9378 |
| UTS (psi) | | 800 | 784 | 791 | 773 |
| UE (%) | | 260 | 300 | 282 | 351 |
| M100 (psi) | | 657 | 615 | 632 | 614 |
| Wt. Gain (%) | | 67.0 | 71.3 | 63.7 | 74.7 |
| LCR @ 1200/s (Pa·s) | | 42.3 | 43.0 | 43.9 | 46.5 |
| ESR (Ra, μin.) | | 40 | 29 | 33 | 27 |
| $T_c$ (° C.) | | 120.93 | 120.62 | 112.32 | 117.67 |
| Comp. Set (%) 22 hours @ room temp | | 30.9 | 32.7 | 38.3 | 38.4 |
| Comp. Set (%) 22 hours @ 70° C. | | 48.2 | 48.1 | 51.8 | 62.4 |

TABLE 3

Thermoplastic Vulcanizates Runs 9A/B-12A/B

| | | Run Number | | | |
|---|---|---|---|---|---|
| | | 9 | 10 | 11 | 12 |
| | | Inventive (I) or Comparative (C) | | | |
| | | C | C | I | I |
| Location of HPN-68L Addition | | | | | |
| Raw Material | Barrel # | phr | phr | phr | phr |
| ExxonMobil Vistalon 3666 EPDM | 1 | 175.00 | 175.00 | 175.00 | 175.00 |
| Burgess Pigment Co. Icecap K (anhydrous kaolin clay) | 1 | 12.00 | 12.00 | 12.00 | 12.00 |
| ZnO | 1 | 1.94 | 1.94 | 1.94 | 1.94 |
| SnCl2 | 1 | 1.26 | 1.26 | 1.26 | 1.26 |
| Ampacet Corp. 49974 Carbon Black Masterbatch | 1 | 21.34 | 32.07 | 21.34 | 32.07 |

TABLE 3-continued

Thermoplastic Vulcanizates Runs 9A/B-12A/B

| | | Run Number | | | | | | | |
|---|---|---|---|---|---|---|---|---|---|
| | | 9 | | 10 | | 11 | | 12 | |
| | | Inventive (I) or Comparative (C) | | | | | | | |
| | | C | | C | | I | | I | |
| Location of HPN-68L Addition | | | | | | | | | |
| Raw Material | Barrel # | phr | | phr | | phr | | phr | |
| Sunoco F180A (propylene homopolymer) | 1 | — | | 60.92 | | — | | 60.92 | |
| ExxonMobil 7032 E2 (propylene impact copolymer) | 1 | 36.41 | | 68.89 | | 36.41 | | 68.89 | |
| Sunoco Sunpar 150M (process oil) | 2D | 10.00 | | 10.00 | | 10.00 | | 10.00 | |
| Schenectady International Inc. HRJ-14247A (Phenolic Resin Cure Agent in Oil) | 4D | 8.33 | | 12.37 | | 8.33 | | 12.37 | |
| Sunoco Sunpar 150M (process oil) | 8D | 86.91 | | 86.60 | | 78.90 | | 76.16 | |
| Sunoco Sunpar 150M (process oil) | 10U | — | | — | | 8.01 | | 10.44 | |
| HPN-68L (3.3 wt. % process oil slurry) | 10U | — | | — | | 0.89 | | 1.16 | |
| HI5-5 | 10U | — | | — | | — | | — | |
| Total | | 353.19 | | 461.05 | | 354.08 | | 462.21 | |
| Sample A or B | | A | B | A | B | A | B | A | B |
| Porosity | | 0 | 0 | 0 | 0 | 0 | 0 | 0 | 20 |
| Moisture (%) | | 0.028 | 0.023 | 0.007 | 0.004 | 0.021 | 0.026 | 0.015 | 0.020 |
| Hardness (Shore A) | | 52.9 | 52.6 | 86.6 | 87.1 | 51.9 | 51.5 | 87.1 | 87.8 |
| S.G. | | 0.902 | 0.900 | 0.910 | 0.911 | 0.909 | 0.911 | 0.915 | 0.916 |
| UTS (psi) | | 484 | 531 | 894 | 861 | 467 | 451 | 912 | 823 |
| UE (%) | | 377 | 395 | 356 | 322 | 339 | 362 | 328 | 280 |
| M100 (psi) | | 198 | 213 | 638 | 653 | 205 | 202 | 655 | 643 |
| Wt. Gain (%) | | 120 | 120 | 70 | 68 | 123 | 133 | 68 | 64 |
| LCR @ 1200/s (Pa·s) | | 49.1 | 50.2 | 43.3 | 42.9 | 49.9 | 51.6 | 42.1 | 40.6 |
| ESR (Ra, μin.) | | 36 | n/a | 16 | 22 | 79 | 112 | 18 | 15 |
| $T_c$ (° C.) | | 104.6 | 104.9 | 108.9 | 108.8 | 116.3 | 116.1 | 120.7 | 120.7 |
| Comp. Set (%) 22 hours @ 70° C. temp | | 26.3 | — | 48.3 | — | 21.0 | — | 46.7 | — |
| Comp. Set (%) 70 hours @ 100° C. | | 31.9 | — | 60.8 | — | 30.3 | — | 61.2 | — |
| Comp. Set (%) 70 hours @ 125° C. | | 41.7 | — | 75.4 | — | 43.4 | — | 70.7 | — |

TABLE 4

Thermoplastic Vulcanizates Runs 13A/B-14A/B

| | | Run Number | |
|---|---|---|---|
| | | 13 | 14 |
| | | Inventive (I) or Comparative (C) | |
| | | I | I |
| Location of HPN-68L Addition | | | |
| Raw Material | Barrel # | phr | phr |
| ExxonMobil Vistalon 3666 EPDM | 1 | 175.00 | 175.00 |
| Tavco Chemical Icecap K (anhydrous kaolin clay) | 1 | 12.00 | 12.00 |
| ZnO | 1 | 1.94 | 1.94 |
| SnCl2 | 1 | 1.26 | 1.26 |
| Ampacet Corp. 49974 Carbon Black Masterbatch | 1 | 21.34 | 32.07 |
| Sunoco F180A (propylene homopolymer) | 1 | — | 60.92 |
| ExxonMobil 7032 E2 (propylene impact copolymer) | 1 | 27.79 | 57.65 |
| Sunoco Sunpar 150M (process oil) | 2D | 10.00 | 10.00 |
| Schenectady International Inc. HRJ-14247A (Phenolic Resin Cure Agent in Oil) | 4D | 8.33 | 12.37 |
| Sunoco Sunpar 150M (process oil) | 8D | 86.91 | 86.60 |
| Sunoco Sunpar 150M (process oil) | 10U | — | — |
| HPN-68L (3.3 wt. % process oil slurry) | 10U | — | — |
| HI5-5 | 10U | 18.14 | 23.67 |
| Total | | 362.71 | 473.48 |
| Sample A or B | | A        B | A        B |
| Porosity | | 5        25 | 20       25 |
| Moisture (%) | | 0.018    0.023 | 0.039    0.015 |
| Hardness (Shore A) | | 50.2     49.2 | 68.7     69.0 |
| S.G. | | 0.919    0.928 | 0.934    0.932 |
| UTS (psi) | | 395      338 | 592      593 |
| UE (%) | | 313      325 | 351      332 |
| M100 (psi) | | 183      168 | 335      348 |
| Wt. Gain (%) | | 132      161 | 99       105 |
| LCR @ 1200/s (Pa·s) | | 50.1     51.7 | 45.1     44.0 |
| ESR (Ra, μin.) | | 125      175 | 43       22 |
| $T_c$ (° C.) | | 120      119.7 | 121.8    121.5 |

What is claimed is:

1. A thermoplastic vulcanizate composition comprising a thermoplastic consisting of at least one polyproylene, a dispersed phase consisting of a dynamically-cured ethylene-propylene-diene rubber, a disodium salt of rel-(1R,2R,3S,4S)-bicyclo[2.2.1]heptane-2,3-dicarboxylic acid crystallization agent, a curative consisting essentially of a cure agent and a curing coagent, and filler consisting of clay and carbon black, wherein the thermoplastic vulcanizate composition exhibits a crystallization temperature (Tc) at least 6° C. greater than that of the thermoplastic composition vulcanizate absent the crystallization agent,
wherein the thermoplastic vulcanizate is prepared within an extruder by dynamically vulcanizing the rubber with the curative that is added to the extruder and wherein the crystallization agent is added to the extender downstream of the curative to thereby produce the thermoplastic vulcanizate having a degree of cure where not more than 10 wt. % of the rubber is extractable by cyclohexane at 23° C.,
where the thermoplastic vulcanizate demonstrates a weight gain of less than or equal to 71.3% when immersed in oil for 24 hours at 121° C. in accordance with ASTM D471 and ISO 1817, and a compression set of less than or equal to 51.1% after compression for 22 hours at 70° C. in accordance with ISO815:1991.

2. The thermoplastic vulcanizate composition of claim 1, wherein the at least one polypropylene is a propylene homopolymer and the propylene homopolymer exhibits a MFR of from 0.1 dg/min to 50 dg/min.

3. The thermoplastic vulcanizate composition of claim 1, wherein the thermoplastic vulcanizate exhibits a Tc at least 12° C. greater than that of the thermoplastic vulcanizate composition absent the crystallization agent.

4. The thermoplastic vulcanizate composition of claim 1, wherein the thermoplastic vulcanizate exhibits a Tc at least 14° C. greater than that of the thermoplastic vulcanizate composition absent the crystallization agent.

5. The thermoplastic vulcanizate composition of claim 1, wherein the cure agent is a(n) free-radical cure agent, hydrosilylation agent, phenolic resin, amine agent or combinations thereof.

6. The thermoplastic vulcanizate composition of claim 5, wherein the cure agent is a(n) alkylphenol-formaldehyde resin, alkylsiloxane, organic peroxide, polysiloxane or bis(dimethylsilyl)benzene.

7. The thermoplastic vulcanizate composition of claim 1, wherein the propylene polymer thermoplastic is present in an amount of from 5 phr to 500 phr and the cure agent is present in an amount of from 0.1 phr to 15 phr.

8. The thermoplastic vulcanizate composition of claim 1, wherein the crystallization additive is present in the amount of from 0.05 wt % to 1.0 wt % based on the total weight of the thermoplastic vulcanizate composition.

9. The thermoplastic vulcanizate composition of claim 1, wherein the crystallization agent is present in the amount of from 0.1 wt % to 0.5 wt % based on the total weight of the thermoplastic vulcanizate composition.

10. The thermoplastic vulcanizate composition of claim 1, wherein the crystallization additive is present in the amount of from 0.15 wt % to 0.35 wt % based on the total weight of the thermoplastic vulcanizate composition.

11. The thermoplastic vulcanizate composition of claim 1, wherein the crystallization agent is present in the amount of from 0.2 wt % to 0.3 wt % based on the total weight of the thermoplastic vulcanizate composition.

12. The thermoplastic vulcanizate composition of claim 1, further comprising one or more additives selected from the group consisting of antioxidants, stabilizers, rubber processing oils, rubber/thermoplastic compatibilizing agents, lubricants, antiblock agents, antistatic agents, waxes, coupling agents, foaming agents, pigments, and flame retardants.

13. The thermoplastic vulcanizate composition of claim 1, wherein the thermoplastic vulcanizate exhibits a Shore A hardness of from 20 to 97.

14. A shaped article comprising thermoplastic vulcanizate composition of claim 1.

15. The shaped article of claim 14, wherein the shaped article is selected from the group consisting of grips, grippable surfaces on consumer goods, gaskets, housings, seals, motor mounts, automobile exterior trim pieces, interior trim pieces, instrument panels, bumper fascia, body plugs, interior knee pads, weather seal components, and door panels.

16. The shaped article of claim 14, wherein the shaped article is shaped by thermoforming, extrusion, blow molding, injection molding, compression molding, injection-compression molding, or rotational molding.

17. The thermoplastic vulcanizate composition of claim 1, where the thermoplastic vulcanizate has a degree of cure where not more than 6 wt. % of the rubber is extractable by cyclohexane at 23° C.

18. The thermoplastic vulcanizate composition of claim 1, where the thermoplastic vulcanizate has a degree of cure where not more than 5 wt. % of the rubber is extractable by cyclohexane at 23° C.

19. The thermoplastic vulcanizate composition of claim 1, where the thermoplastic phase includes a propylene homopolymer and a propylene-based low crystallinity impact copolymer.

20. The thermoplastic vulcanizate composition of claim 1, wherein the thermoplastic vulcanizate exhibits a Tc at least 8° C. greater than that of the thermoplastic vulcanizate composition absent the crystallization agent.

21. The thermoplastic vulcanizate composition of claim 1, wherein the thermoplastic vulcanizate exhibits a Tc at least 10° C. greater than that of the thermoplastic vulcanizate composition absent the crystallization agent.

22. The thermoplastic vulcanizate composition of claim 1, where the crystallization agent is added to the extruder downstream of the curative as a suspension within a process oil.

23. The thermoplastic vulcanizate composition of claim 1, where the crystallization agent is added to the extruder downstream of the curative as a masterbatch blended with a thermoplastic resin.

* * * * *